(12) United States Patent
Yuasa

(10) Patent No.: US 7,486,825 B2
(45) Date of Patent: Feb. 3, 2009

(54) IMAGE PROCESSING APPARATUS AND METHOD THEREOF

(75) Inventor: Mayumi Yuasa, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 555 days.

(21) Appl. No.: 11/137,520

(22) Filed: May 26, 2005

(65) Prior Publication Data
US 2005/0265604 A1 Dec. 1, 2005

(30) Foreign Application Priority Data
May 27, 2004 (JP) ............... 2004-158352

(51) Int. Cl.
*G06K 9/46* (2006.01)
(52) U.S. Cl. ............... 382/190; 382/216; 382/118
(58) Field of Classification Search ............... 382/118, 382/190, 181, 199
See application file for complete search history.

(56) References Cited

U.S. PATENT DOCUMENTS

| | | | | |
|---|---|---|---|---|
| 5,719,951 | A * | 2/1998 | Shackleton et al. | 382/118 |
| 5,982,912 | A * | 11/1999 | Fukui et al. | 382/118 |
| 2002/0012454 | A1* | 1/2002 | Liu et al. | 382/118 |
| 2002/0080425 | A1* | 6/2002 | Itokawa | 358/496 |
| 2003/0108225 | A1* | 6/2003 | Li | 382/118 |
| 2003/0123713 | A1* | 7/2003 | Geng | 382/118 |
| 2003/0130035 | A1* | 7/2003 | Kanarat | 382/190 |
| 2003/0198368 | A1* | 10/2003 | Kee | 382/118 |

FOREIGN PATENT DOCUMENTS

| | | |
|---|---|---|
| JP | 3279913 | 2/2002 |
| JP | 2003-141552 | 5/2003 |
| WO | WO 0209025 A1 * | 1/2002 |
| WO | WO 02093493 A1 * | 11/2002 |

OTHER PUBLICATIONS

Kanade et al., 'Shape and motion from image streams: A Factorization method', Nov 1993, National Academy of Science Colloquium Paper, vol. 90, pp. 9795-9802.*

(Continued)

*Primary Examiner*—Brian Q Le
*Assistant Examiner*—Pierre Diverse
(74) *Attorney, Agent, or Firm*—Finnegan, Henderson, Farabow, Garrett & Dunner, L.L.P.

(57) ABSTRACT

An image processing apparatus for detecting, at high precision, the contours of the eyes and the lips from an image including a shot of the face is provided. The apparatus includes an image input portion used to input an image, a feature point detecting portion that detects plural feature points of the object from the input image, a facial pose estimating portion that estimates a rotation angle indicating a facial pose from the detected, plural feature points, an initial parameter correcting portion that estimates initial parameters to detect the contours of the eye and the lips from the detected, plural feature points, and corrects the estimated initial parameters using the estimated rotation angle, an initial contour generating portion that generates an initial contour of the object using the corrected initial parameters, and a contour generating portion that generates a final contour from the initial contour.

6 Claims, 5 Drawing Sheets

OTHER PUBLICATIONS

Ip et al., 'An affine-invariant active contour model (AI-Snake) for model-based segmentation', 1998. Image and Vision Computing, vol. 16, pp. 135-146.*

Yuasa et al., "Precise Pupil Contour Detection and its Application to Digital Makeup System," Technical Report of IEICE (Jul. 2002), PRMU 2002-62, pp. 37-42.

Fukui et al., "Facial Feature Point Extraction Method Based on Combination of Shape Extraction and Pattern Matching," D-II (Aug. 1997), J80-D-II:2170-77.

Kass et al.; "Snakes: Active Contour Models"; International Journal of Computer Vision, vol. 1, No. 4, pp. 321-331, (1988).

Yuasa et al.; "Precise Pupil Contour Detection Based on Minimizing the Energy of Pattern and Edge"; IEICE Trans. Inf. & Syst., vol. E87-D, No. 1, pp. 105-112, (2004).

Ip et al.; "An Affine-Invariant Active Contour Model (AI-Snake) for Model-Based Segmentation"; Image and Vision Computing, vol. 16, pp. 135-146, (1998).

Carlo Tomasi, "Shape and Motion from Image Streams: A Factorization Method;" School of Computer Science, Carnegie Mellon University; Sep. 1991; CMU-CS-91-172.

Carlo Tomasi et al., "Shape and Motion from Image Streams under Orthography: A Factorization Method;" International Journal of Computer Vision; 1992; pp. 137-152; vol. 9:2; Kluwer Academic Publishers, The Netherlands.

* cited by examiner

DIVIDED EQUALLY BY n-1
i= 1,...,n

DIVIDED EQUALLY BY n-1
i= 1,...,n

400
IMAGE PROCESSING APPARATUS AND METHOD THEREOF

CROSS-REFERENCE TO RELATED APPLICATIONS

This application is based upon and claims the benefit of priority from the prior Japanese Patent Application No. 2004-158352, filed on May 27, 2004; the entire contents of which are incorporated herein by reference.

TECHNICAL FIELD

The present invention relates to an image processing apparatus for detecting a contour of an object from an image and a method thereof.

BACKGROUND OF THE INVENTION

A method of using active contour models, as is disclosed, for example, in M. Kass, A. Witkin, and D. Terzopoulos, "Snakes: Active Contour Models", *International Journal of Computer Vision*, Vol. 1, No. 4, pp. 321-331, 1988, has been known as a method of detecting a contour of an object. The active contour models are used to detect a contour by setting energy to contour models and then minimizing the energy. The active contour models have an advantage that a contour can be detected even when the contour edge of an object is disconnected; however, they have problems that a processing time for convergence computation is too long and the computation fails when initial parameters are too different.

Recently, there has been proposed a contour detecting method using affine transformation, as is disclosed in H.H.S. Ip, D. Shen, "An affine-invariant active contour model (AI-snake) for model-based segmentation", *Image and Vision Computing*, Vol. 16, pp. 125-146, 1998. This contour detecting method, however, merely allows variation with respect to models, and it is not a method of actively obtaining transform parameters.

Further, there has been disclosed a method of detecting feature points, such as the eye, from an image of the face of an individual (for example, see Japanese Patent No. 3279913, and Kazuhiro Fukui and Osamu Yamaguchi, "Keijyou tyuushutsu to patanshougou no kumiawaseniyoru kaotokutyouten tyuushutsu", *Shingakuron* (D-II), vol. J80-D-II, no. 9, pp. 2170-2177, August 1997). However, variation of the facial pose is not particularly concerned in this contour detecting method, and this method has a problem that a huge volume of training data is necessary for pattern matching.

Incidentally, digital makeup has been recently proposed, by which a face image is inputted and makeup is put on the face image digitally (Yuasa, et al, "Hitomi-rinkaku no kouseido tyuushutsu to dejitarumeikuheno ouyou", *PRMU* 2002-62, pp. 37-42, Jul., 2002).

Digital makeup is to put eye shadow around the eyes or put lipstick on the lips of the face image digitally. When such digital makeup is put on, makeup can be put on within an intended region, such as the vicinity of the eyes, if the face image was taken from the front. When the face is not facing the front and its orientation is rotated with respect to the front, makeup cannot be put well on the input face image, which raises a problem that the makeup is out of the intended region.

This problem is attributed to the inability to detect contours of the eyes, the lips, etc. exactly due to the tilt of the face. In other words, initial parameters needed to detect contours are not changed to initial parameters corresponding to variance of the facial pose. It is difficult for the contour detecting method in the related art to detect contours quickly and exactly using the initial parameters changed by taking variance of the facial pose into account.

In order to solve these problems, the invention provides an image processing apparatus capable of detecting feature points or contours with ease by transforming initial parameters used when detecting feature points or contours depending on the posture of an object, such as the face.

BRIEF SUMMARY OF THE INVENTION

An image processing apparatus according to one aspect of the invention is an image processing apparatus for detecting a contour of an object from an image including a shot of the object, which is provided with: an image input processing portion used to input the image; a feature point detection processing portion that detects plural feature points of the object from the input image; a posture estimation processing portion that estimates a rotation angle indicating a posture of the object from the detected, plural feature points; an initial parameter estimation processing portion that estimates initial parameters to detect the contour of the object from the detected, plural feature points; an initial parameter correction processing portion that corrects the estimated initial parameters using the estimated rotation angle; and a contour generation processing portion that generates the contour of the object using the corrected initial parameters.

According to one aspect of the invention, the contour can be readily detected by transforming initial parameters used when detecting the contour depending on the posture of the object, such as the face.

DETAILED DESCRIPTION OF THE INVENTION

Hereinafter, embodiments of the invention will be described in detail.

FIRST EMBODIMENT

A first embodiment of the invention will now be described. This embodiment will describe an image processing apparatus 10 that detects contours of the eyes from an image including a shot of the face of an individual.

(1) Configuration of Image Processing Apparatus 10

Figure 1:
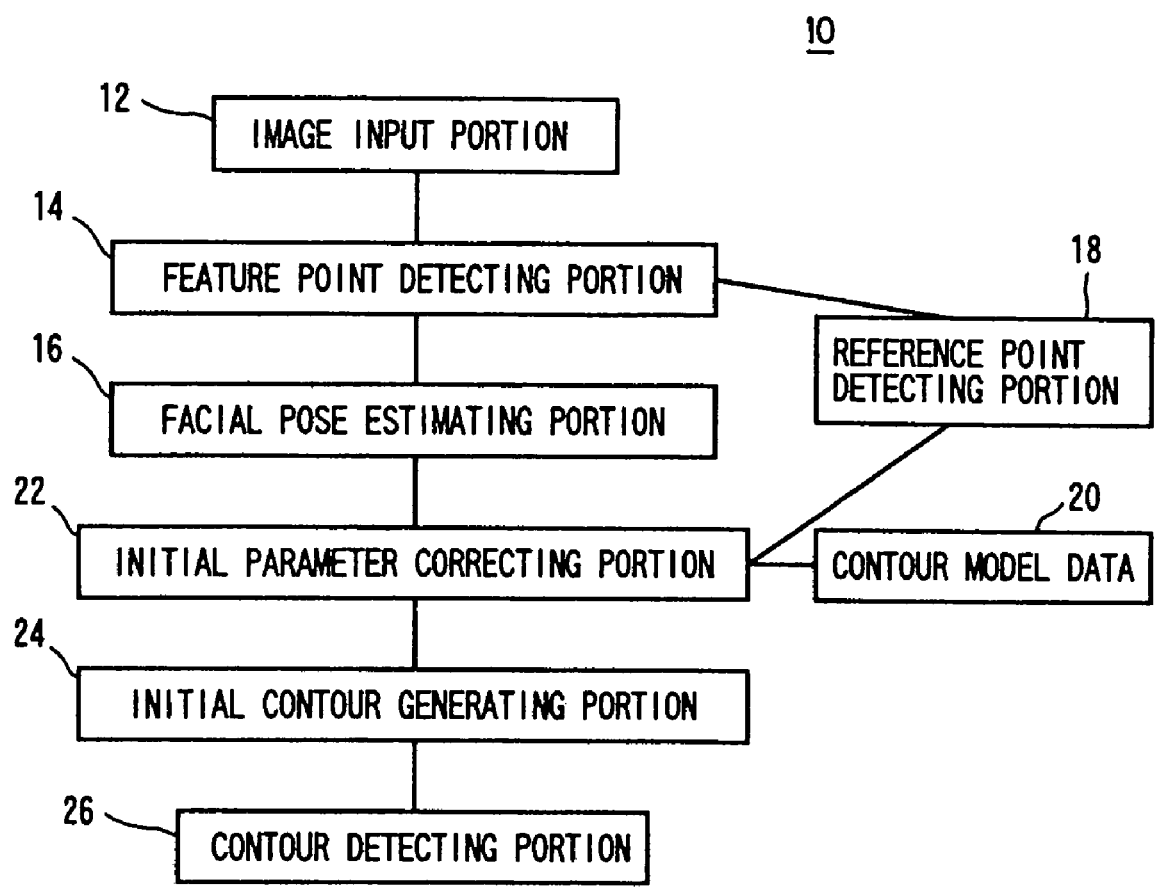
FIG. 1 is a view showing the configuration of a first embodiment.

FIG. 1 is a view showing the configuration of the image processing apparatus 10 of this embodiment.

An image input portion 12 is used to input a moving image from a camera.

A feature point detecting portion 14 detects necessary feature points from the image.

A facial pose estimating portion 16 estimates the facial pose from the detected feature points.

A reference point estimating portion 18 finds the positions of estimated reference points using the detected feature points.

Contour model data 20 is data needed to describe a contour created in advance.

An initial parameter correcting portion 22 corrects the position coordinates of the estimated reference points estimated by the reference point estimating portion 18 and initial parameters created from the contour model data 20, using the estimated facial pose.

An initial contour generating portion 24 generates an initial contour using parameters corrected by the initial parameter correcting portion 22.

A contour detecting portion 26 detects an exact contour of the object using the initial contour generated by the initial contour generating portion 24.

The configurations of the respective components 12 through 26 will be described in detail below, and the functions of the respective components 12 through 26 are achieved by a program pre-installed in the computer.

(2) Image Input Portion 12

The image input portion 12 is used to input an image sequence including a shot the face from a video camera. Face images thus inputted are sent to the feature points detecting portion 14 one by one.

(3) Feature Point Detecting Portion 14

Figure 2:
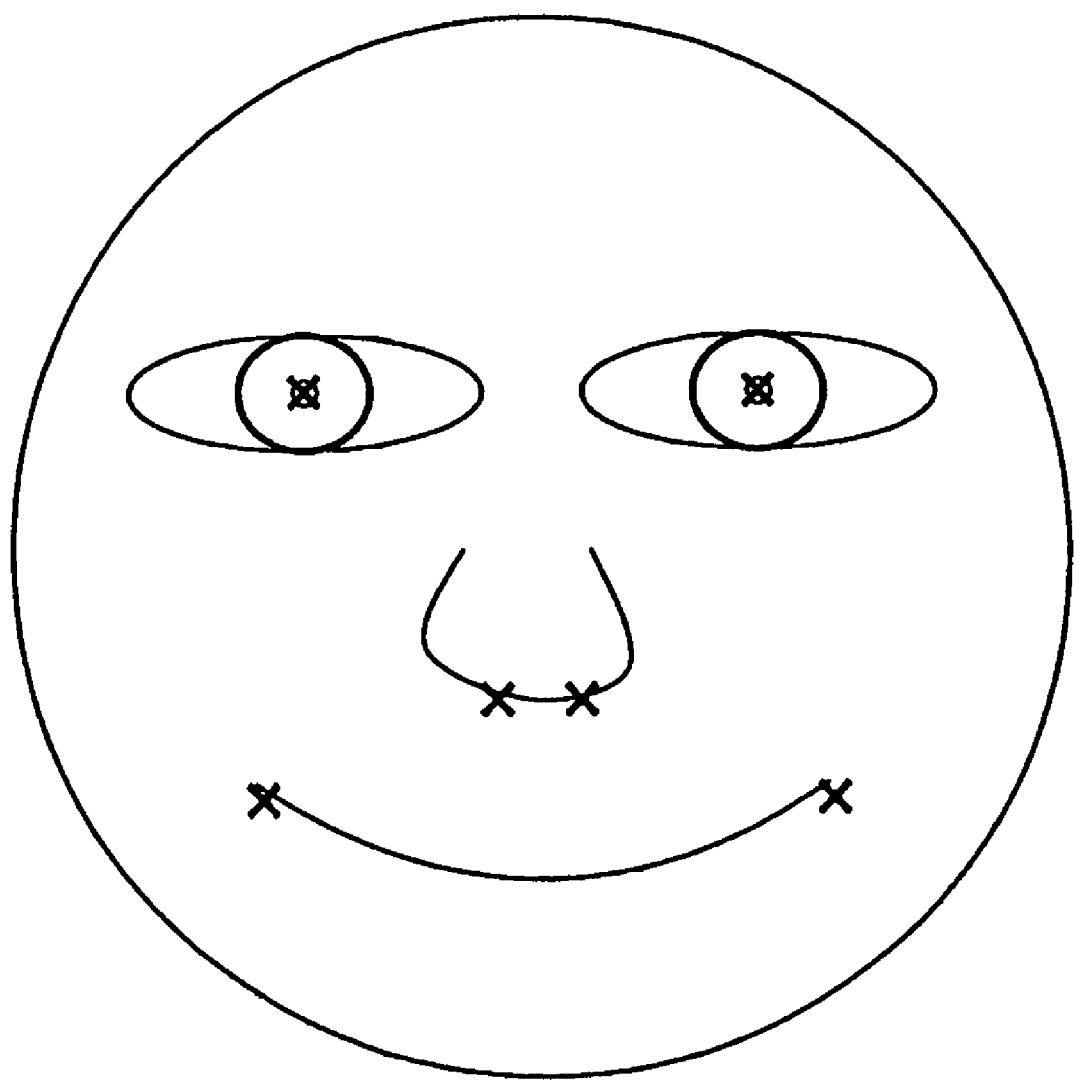
FIG. 2 is a view showing feature point positions.

The feature point detecting portion 14 detects feature points by the method disclosed in Japanese Patent No. 3279913. The feature points detected herein are six points, including the both eyes, the nostrils, the mouth ends, as are shown in FIG. 2. Descriptions will be given herein to a case where the feature points are these six points. It should be noted that besides the two points of the both eyes, at least two other points are necessary in this embodiment.

A detection method will now be described.

First, a separability map is created using a circular separability filter for the entire image. Separability represents a degree of separation of two regions in the form of a normalized value, and is used as the edge intensity.

Second, the peaks of the values representing the separability are detected in the separability map, and these peak positions are deemed as candidates of the feature points.

Third, before the pattern similarity is found for the feature point candidates thus obtained, candidates of a set of six points, including the right and left pupils, the nostrils, and the mouth ends, are selected using the absolute and relative positional relations.

Fourth, the set of six points are verified by local image pattern matching to detect the final feature points.

(4) Facial Pose Estimating Portion 16

The facial pose estimating portion 16 estimates the facial pose geometrically from the feature points detected by the feature point detecting portion 14.

A method of computing the facial pose from the position coordinates of the feature points, proposed in JP-A-2003-141552, will be described herein.

First, feature points, such as the eyes, the nose, and the mouth ends (at least four points), are detected in advance from images including shots of the face (three or more frames of images, each including a shot of the face at a different facial pose).

Second, 3-D coordinates of the feature points are found from the feature point position coordinates by factorization (for example, C. Tomasi and T. Kanade, *Technical Report CMU-CS-91172*, CMU, 1991, and *International Journal of Computer Vision*, 9:2, pp. 137-154, 1992). A matrix having the 3-D coordinates of these feature points as elements is maintained as a shape matrix S.

Third, upon input of an image including a shot of the face whose orientation is to be found, feature points are detected from this image.

Fourth, a motion matrix $M_{new}$, indicating the facial pose, is found by multiplying a measurement matrix $W_{new}$ having 2-D coordinates of these feature points as elements by a generalized inverse matrix $S^+$ of the shape matrix S, from which rotation angles of roll, pitch, and yaw can be found.

Figure 3:
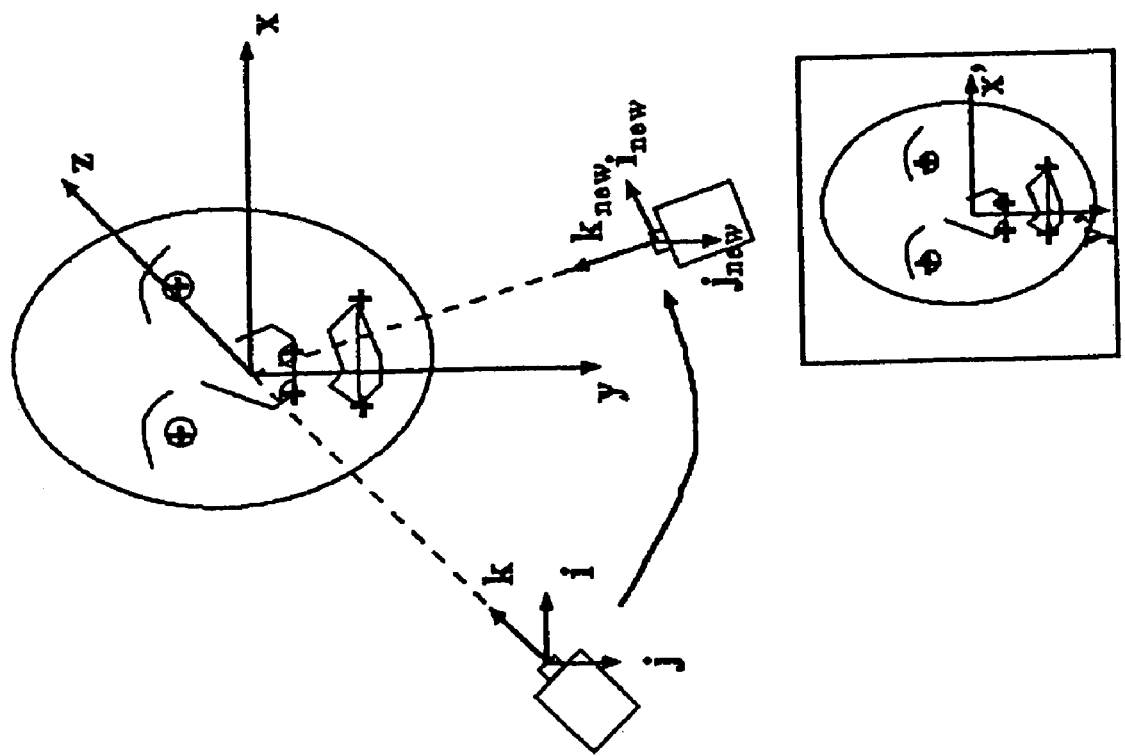
FIG. 3 is a view used to describe facial pose estimation.

FIG. 3 shows a manner in which the motion matrix $M_{new}$ is computed. Referring to FIG. 3, movements of the face with respect to the camera that remains stationary are relatively assumed as changes of the orientation of the camera with respect to the face that remains stationary. It is sufficient to use the feature point coordinates detected by the feature point detecting portion 14, and the orientation itself can be found by multiplying the matrixes once. Therefore, this scheme is extremely fast and errors will not be accumulated because computation is performed frame by frame independently.

(5) Reference Point Estimating Portion 18

The reference point estimating portion 18 uses candidate positions of the points on the outer and inner corners of the eyes estimated by the feature point detecting portion 14 as pseudo reference points (hereinafter, referred to as the estimated reference points). In this embodiment, the estimated reference points are points denoted by marks x labeled with reference numeral 401 in FIG. 4 that are used to detect the contours of the eyes. These reference points are found because they are initial parameters needed to detect the contours.

Figure 4:
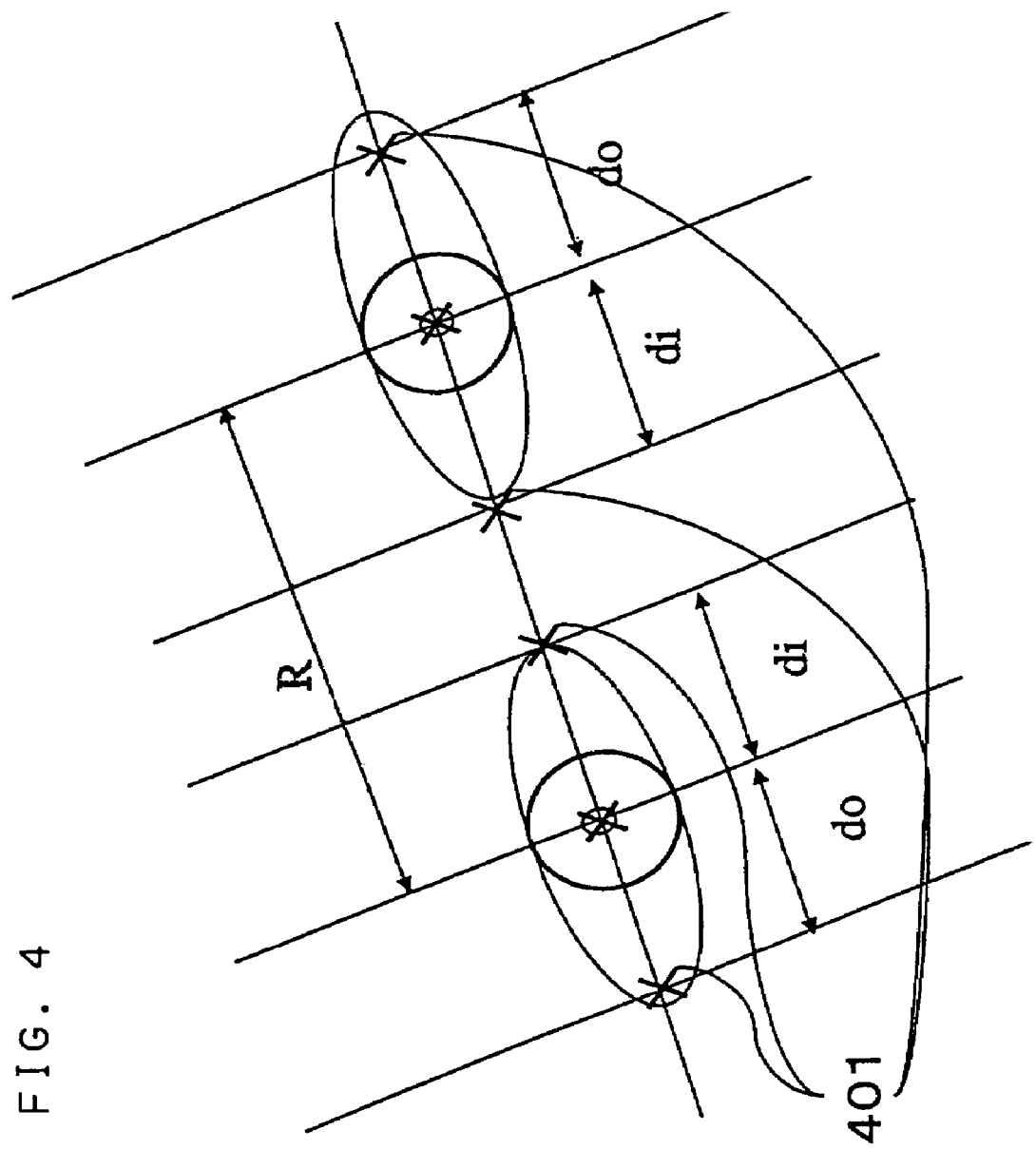
FIG. 4 is a view used to describe parameters for the contour of the eye.

Herein, the candidate positions of the inner and outer corners of the eyes are determined from the positions of the both pupils by a predetermined method on the basis of FIG. 4.

First, a distance R between the pupils is computed on a straight line linking the centers of the pupils, which are the feature points found previously.

Second, di and d0 are found by multiplying the distance R between the pupils thus found by a predetermined coefficient. These di and d0 represent distances from the center of the pupil to the inner side and to the outer side, respectively. The positions of the di and d0 are deemed as estimated reference points A and B at the candidate positions of the inner and outer corners of the eyes, respectively.

(6) Contour Model Data 20

The contour model data 20 will now be described. The data is recorded in a hard disc or the like in the computer.

For the contours of interest in this embodiment, initial contours are generated on the basis of sample principal component vectors used to generate contours with reference to the candidate positions of the inner and outer corners of the eyes. The sample principal component vectors used in this instance have been computed and stored previously in the contour model data 20.

(6-1) Computation Method of Sample Principal Component Vectors

The computation method of the sample principal component vectors will be described first for the left eye (the right eye as you face it). Let sample reference points A0 ($a_x$, $a_y$) and B0 ($b_x$, $b_y$) be the candidate points of the inner and the outer corners of the eye, respectively. Then, given N as the dimension of the sample principal component vectors, a j'th principal component vector, $p^j=(p^j_1, \ldots, p^j_N)$, is found as follows.

First, the sample reference points A0 and B0 are determined.

Figure 5:
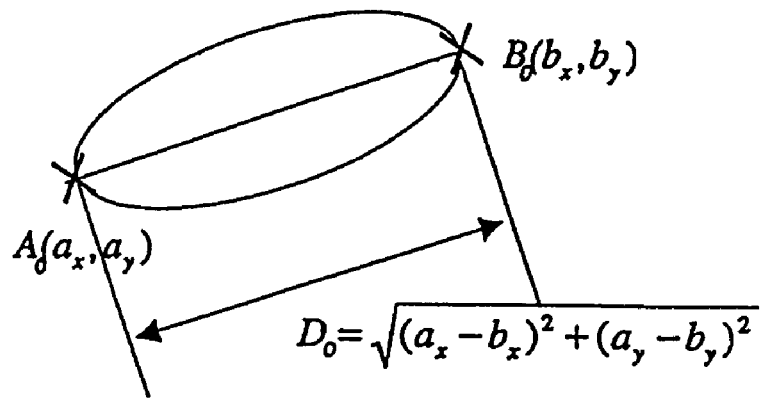
FIG. 5 is a first view used to describe a contour model of the eye.

Second, a distance D0 between the sample reference points A0 and B0 is found (see FIG. 5).

Third, a line segment linking the sample reference points A0 and B0 is divided by a predetermined divisor n−1.

Figure 6:
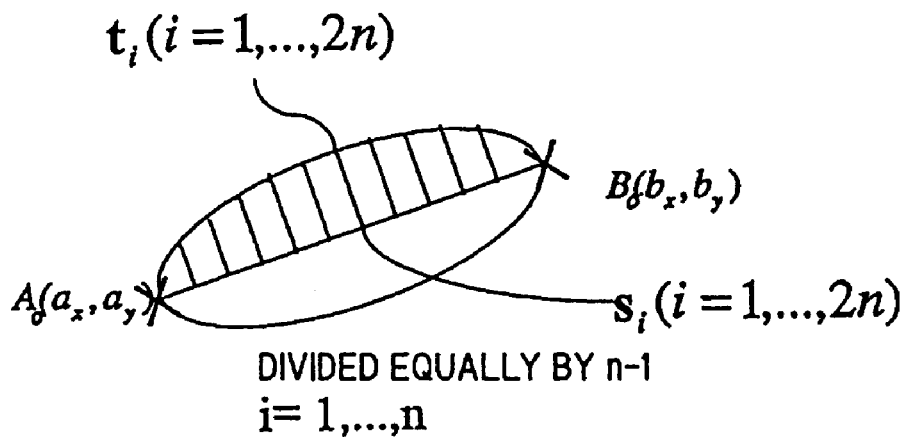
FIG. 6 is a second view used to describe the contour model of the eye.

Fourth, let $t_i$ (i=1, ..., 2n) be a point at which a straight line, extended perpendicularly in the direction shown in FIG. 6 from each divided point $s_i$ (i=1, ..., 2n) on the line segment linking the sample reference points A0 and B0, intersects with the contour (see FIG. 6).

Figure 7:
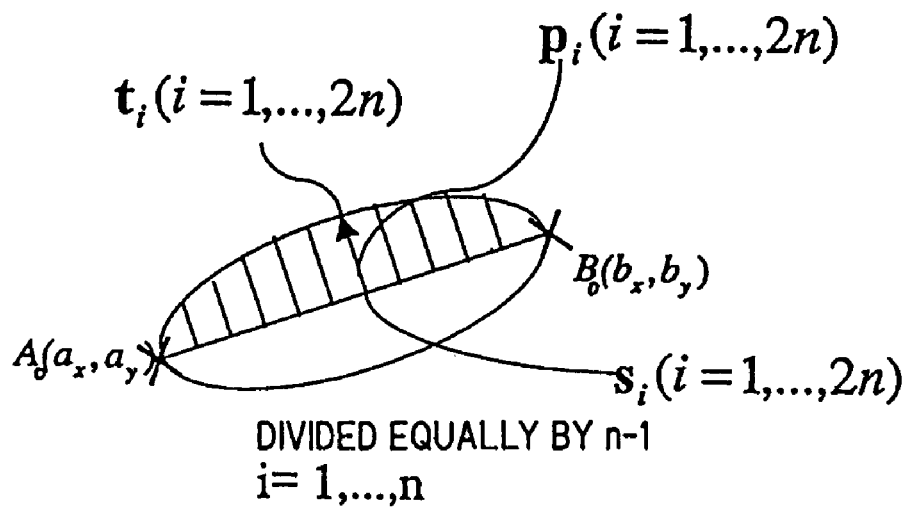
FIG. 7 is a third view used to describe the contour model of the eye.

Fifth, a singed distance between $s_i$ and $t_i$ is normalized by the distance D0 between A0 and B0, which is deemed as an i'th component pi of the sample vector (see FIG. 7). In this instance, a vector from A0 to B0 (upper side) is brought into correspondence with i=0, ..., n, and a vector from B0 to A0 (lower side) is brought into correspondence with i=n+1, ..., N (where s=2n).

Sixth, principal component analysis is performed on such a sample vector. The resulting sample principal component vector is obtained as $p^j=(p^j_1, \ldots, p^j_N)$.

(6-2) Computation Method of Normalized Contour q

A normalized contour q is computed from the stored sample principal component vector in accordance with Equation 1 below. The normalized contour q is computed because it is needed when the initial contour is computed.

$$q = \sum_{j=1}^{k} C^j P^j \quad \text{Equation 1}$$

where $C^j$ is an arbitrary coefficient. Herein, principal components up to the k'th are used.

(7) Initial Parameter Correcting Portion 22

The initial parameter correcting portion 22 uses the estimated reference points A and B estimated by the reference point estimating portion 18 and the data stored in the contour model data 20 (herein, the normalized contour vector q computed from the sample principal component vector is used) as the initial parameters, and corrects these initial parameters in response to the facial pose using the result of the facial pose estimation, thereby finding corrected initial parameters (corrected reference points A' and B' and corrected, normalized contour vector q').

Let $(\theta, \phi, \psi)$ be the rotation angles with respect to the front of the face, and the respective angles represent the roll, the yaw, and the pitch, respectively. In the case of the face, the respective angles represent the roll indicating an in-screen rotation (an angle at which the neck is tilted), the yaw indicating whether the facial pose is rightward or leftward, and the pitch indicating whether the facial pose is upward or downward. The normalized contour is corrected by the transformation described below. It should be noted, however, that the roll is normalized when the contour is generated, and therefore, is not used herein.

(7-1) Computation Method of Corrected, Normalized Contour Vector q'

A computation method of the corrected, normalized contour vector q' will now be described.

When corrections are made in response to the facial pose, the corrected, normalized contour vector q' can be computed from the normalized contour q in accordance with Equation 2:

$$q'=Fq \quad \text{(Equation 2)}$$

F varies with a 3-D model of an object, and is therefore difficult to find in general. However, in the case of the contour of the eye, approximation as follows is sufficient.

Herein, $F_{ii}(\phi, \psi)$, where F is a diagonal matrix, is described by Equation 3:

$$F_{ii}(\phi, \psi)=c_i|\phi-\phi_{i0}||\psi-\psi_{i0}| \quad \text{(Equation 3)}$$

where $c_i$, $\phi_{i0}$, and $\psi_{i0}$ are constants experimentally found.

(7-2) Computation Method of Corrected Reference Points A' and B'

A computation method of the corrected reference points A' and B' will now be described.

Herein, $a=(a_x, a_y)^T$ is given for the estimated reference point $A=(a_x, a_y)$. Also, $a'=(a'_x, a'_y)^T$ is given for the corrected reference point $A'=(a'_x, a'_y)$, which is the estimated reference point A corrected in response to the facial pose. Then, a' in the corrected reference point A' is found in accordance with Equation 4:

$$a'=Ga(a-x_a)+X_a \quad \text{(Equation 4)}$$

where xa is a constant vector and Ga is a matrix found from $(\phi, \psi)$, both of which are found empirically with respect to their respective reference points.

(8) Initial Contour Generating Portion 24

The initial contour generating portion 24 generates the initial contour using the corrected reference points A' and B' and the corrected, normalized contour vector q', all of which are corrected by the initial parameter correcting portion 22.

The initial contour is generated in the same manner as the method described with the contour model data 20, using the corrected reference points A' and B' and the corrected, normalized contour q'.

More concretely, the contour is generated as follows.

First, a distance D' between the corrected reference points A' and B' is computed.

Second, a point $s'_i$ is found by equally dividing a line segment linking the corrected reference points A' and B' by n−1.

Third, a point $t'_i$, present at a distance $q'_i$ from the point $s'_i$ in a direction D' perpendicular to the line segment linking the corrected reference points A' and B', is found.

Fourth, the initial contour is found by linking all the points $t'_i$ thus found.

Herein, for ease of explanation, k=1 is given in Equation 1 as the normalized contour vector q'. In other words, of the sample principal component vectors, the one comprising the first principal component alone is used.

(9) Contour Detecting Portion 26

The contour detecting portion 26 detects an exact contour using the initial parameters of the corrected initial contour.

Various methods are available as a method of detecting an exact contour. For example, the contour is detected by minimizing the energy using active contour models as is disclosed in M. Kass, A. Witkin, and D. Terzopoulos, "Snakes: Active Contour Models", *International Journal of Computer Vision*, Vol. 1, No. 4, pp. 321-331, 1988, cited above.

Herein, the initial contour is described using the coordinates of the corrected reference points A and B of the initial parameters and the coefficient $C^j$ of the principal component used in Equation 1. With these limited parameters, it is effective to adopt the pupil contour detecting method proposed in "Yuasa, et al, "Hitomi-rinkaku no kouseido tyuushutsu to dejitarumeikuheno ouyou", *PRMU* 2002-62, pp. 37-42, Jul., 2002", cited above. Although elliptic models are used in this cited reference, by using the feature point coordinates and the principal component coefficient or a combination thereof instead of elliptic models, it is possible to detect the contour in the same manner.

This method will be briefly described.

First, patterns are normalized using the initial parameters to generate feature vectors. For example, a method of detecting a strip of surrounding pixels along the contour may be adopted as a normalization method. Also, a subspace is generated from feature vectors that underwent pattern normalization on the basis of pre-stored sample parameters. This subspace is referred to as a correct subspace.

Second, a subspace is generated from feature vectors that underwent pattern normalization in the same manner for the parameters obtained by varying the sample parameters by a predetermined quantity. This subspace is referred to as a guide subspace.

Third, similarity with the correct subspace and similarities with the guide subspace are found by the subspace method.

Fourth, when a subspace achieving the highest similarity is the correct subspace, the processing is stopped, and the next processing is performed.

Fifth, when the subspace achieving the highest similarity is the guide subspace, parameters are changed in an appropriate direction within the parameter space depending on the parameters in the guide subspace.

Sixth, the next processing is started when the highest similarity with the correct subspace is achieved or after the processing is repeated a predetermined number of times.

Seventh, the edge intensity along the contour is found. A normal differential filter maybe used for the edge intensity, and it is more robust to use the separability described above.

Eighth, searches are performed further within the parameter space, so that a sum of similarities between the edge intensity found as described above and the correct subspace reaches the highest value. The contour generated from the parameters found as has been described is the result of the contour detection found in this embodiment.

SECOND EMBODIMENT

A second embodiment of the image processing apparatus 10 will now be described. In this embodiment, the lip are detected.

The contour of the lips is detected in the same manner as the contour of the eye is detected.

The feature points are two points at the mouth ends. The contour of the lips deforms considerably in comparison with the contour of the eye, and the numbers of parameters has to be increased depending on a degree of allowed deformation.

Also, there is a case where it is difficult to describe a diagonal matrix F by a first order variable of the rotation angle.

However, this difficulty arises at the final stage where the contour is detected, and in most cases, such a precise exactness is not needed at the stage where the initial parameters are corrected.

Herein, as with the contour of the eye, the first principal components alone are used for the initial contour, and when the contour is detected actually, the number of parameters is increased for the contour to be detected.

(Modification)

The invention is not limited to the embodiments above, and can be modified in various manners without deviating from the scope of the invention.

(1) First Modification

The first and second embodiments described cases where the contour is detected. However, the contour is not necessarily detected, and a set of more than one feature point may be detected instead.

(2) Second Modification

The first and second embodiments used the principal component contour as the contour model. However, the invention is not limited to this configuration, and arbitrary parametric models can be used instead. For example, a spline curve may be used.

(3) Third Modification

A diagonal matrix is used herein as a matrix F found from the rotation angle. However, the invention is not limited to this configuration.

(4) Fourth Modification

A rotation angle from the front was used when parameters are transformed from the rotation angle. However, the invention is not limited to this configuration, and parameters may be transformed on the basis of a quantity of rotation from the preceding frame by taking an advantage of being a moving image. When configured in this manner, initial parameters that are more precise can be set.

(5) Fifth Modification

Normalization was performed using the distance D alone when a contour model was created from the sample contour. However, it is more effective when irregularities of data caused by the facial pose at the time of data acquisition are suppressed by adding inverse transformation of the transformation described by Equation 2 above.

(6) Sixth Modification

The embodiments above described the facial pose by way of example, and in a case where the object is other than the face, the initial parameters are corrected on the basis of the posture of the object.

INDUSTRIAL APPLICABILITY

The invention is effective in a case where the contour of an object is detected from an image, and for example, in a case where digital makeup is put on the face in an image, makeup can be put exactly on the intended position by using the invention to detect the contour of the face on which makeup is to be put.

What is claimed is:

1. An image processing apparatus comprising a computer for detecting a contour of an object from an image including a shot of the object, said apparatus comprising:

an image input processing portion that inputs the image;

a feature point detection processing portion that detects a plurality of feature points of the object from the input image;

a posture estimation processing portion that estimates a rotation angle indicating a posture of the object from the plurality of detected feature points;

an initial parameter estimation processing portion configured to estimate initial parameters in order to detect the contour of the object from the plurality of detected feature points;

an initial parameter correction processing portion that corrects the estimated initial parameters using the estimated rotation angle; and a contour generation processing portion that generates the contour of the object using the corrected initial parameters, wherein the initial parameter estimation processing portion estimates reference points for the detection of the contour from the plurality of detected feature points, such that the estimated reference points are used as the initial parameters, the initial parameter correction processing portion computes a normalized contour vector, which is normalized by multiplying each component of a sample principal vector showing a contour of a pre-stored object with a coefficient, and the initial parameter correction processing portion computes corrected reference points and a corrected, normalized contour vector by correcting the computed normalized contour vector and the estimated reference points based on the estimated rotation angle of the object, such that the corrected reference points and the corrected, normalized contour vector are used as the corrected initial parameters.

2. The image processing apparatus according to claim 1, wherein:

a moving image including the shot of the object is inputted into the image input processing portion; and the feature point detection processing portion finds plural feature points of the object in each frame of the input moving image, and wherein the posture estimation processing portion performs tasks as follows:

(1) find a 3-D coordinate of each of the feature points by factorization from the plural feature points found in each frame;

(2) find a shape matrix having the 3-D coordinates found for each feature point as elements;

(3) find a measurement matrix having 2-D coordinates of the plural feature points detected from an image in the input moving image that includes the shot the object whose contour is to be found;

(4) find a motion matrix indicating the posture of the object from the measure matrix and the shape matrix found previously; and (5) find a rotation angle of the object from the motion matrix.

3. The image processing apparatus according to claim 1, wherein the contour generation processing portion performs tasks as follows:

(1) find the initial contour from the corrected initial parameters; and (2) find a final contour from the initial contour found previously.

4. The image processing apparatus according to any of claims 1 through 3, wherein:

the contour of the object to be found is one of a contour of an eye and a contour of lips of an individual, and the posture is a facial pose of the individual.

5. An image processing method for detecting a contour of an object from an image including a shot of the object, using a processor, said method comprising:

inputting the image;

detecting a plurality of feature points of the object from the input image;

estimating, using the processor, a rotation angle indicating a posture of the object from the plurality of detected feature points;

estimating, using the processor, initial parameters to detect the contour of the object from the plurality of detected feature points;

correcting, using the processor, the estimated initial parameters using the estimated rotation angle; and generating the contour of the object using the corrected initial parameters, wherein reference points are estimated for the detection of the contour from the plurality of detected feature points, such that the estimated reference points are used as the initial parameters, a normalized contour vector is computed by multiplying each component of a sample principal vector showing a contour of a pre-stored object with a coefficient, and corrected reference points and a corrected normalized contour vector are computed by correcting the computed normalized contour vector and the estimated reference points based on the estimated rotation angle of the object, such that the corrected reference points and the corrected, normalized contour vector are used as the corrected initial parameters.

6. A computer-readable storage medium comprising a program which, when executed by a processor, performs an image processing method for detecting a contour of an object from an image including a shot of the object, said program causing the computer to perform functions as follows:

inputting the image;

detecting a plurality of feature points of the object from the input image;

estimating a rotation angle indicating a posture of the object from the plurality of detected feature points;

estimating initial parameters to detect the contour of the object from the plurality of detected feature points;

correcting the estimated initial parameters using the estimated rotation angle; and generating the contour of the object using the corrected initial parameters, wherein reference points are estimated for the detection of the contour from the plurality of detected feature points, such that the estimated reference points are used as the initial parameters, a normalized contour vector is computed by multiplying each component of a sample principal vector showing a contour of a pre-stored object with a coefficient, and corrected reference points and a corrected, normalized contour vector are computed by correcting the computed normalized contour vector and the estimated reference points based on the estimated rotation angle of the object, such that the corrected reference points and the corrected, normalized contour vector are used as the corrected initial parameters.

* * * * *